United States Patent
Macbeth

(10) Patent No.: US 6,628,486 B1
(45) Date of Patent: Sep. 30, 2003

(54) FAULT DETECTION DEVICE WITH LINE-LOAD MISWIRE PROTECTION

(75) Inventor: Bruce F. Macbeth, Syracuse, NY (US)

(73) Assignee: Pass & Seymour, Inc., Syracuse, NY (US)

(*) Notice: Subject to any disclaimer, the term of this patent is extended or adjusted under 35 U.S.C. 154(b) by 358 days.

(21) Appl. No.: 09/799,380

(22) Filed: Mar. 5, 2001

Related U.S. Application Data

(60) Provisional application No. 60/187,265, filed on Mar. 6, 2000.

(51) Int. Cl.$^7$ ................................................ H02H 3/00
(52) U.S. Cl. ........................ 361/42; 361/44; 361/45
(58) Field of Search ................................ 361/42, 44, 45

(56) References Cited

U.S. PATENT DOCUMENTS 5,706,155 A * 1/1998 Neiger et al. ................ 361/45
6,266,219 B1 * 7/2001 Macbeth et al. ............. 361/42

* cited by examiner

Primary Examiner—Brian Sircus
Assistant Examiner—James Demakis
(74) Attorney, Agent, or Firm—Wall, Marjama & Bilinski, LLP

(57) ABSTRACT

A protection device connected between hot and neutral conductors of an AC power line includes a fault detection circuit which controls a breaker coil operatively associated with a set of interrupting contacts. A capacitance circuit connected between the hot conductor and the neutral conductor stores a charge of a polarity indicative of a line-load miswire. This stored charge independently activates the set of interrupting contacts when the interrupting contacts are closed and the device is miswired, thus preventing the miswired device from providing power.

14 Claims, 6 Drawing Sheets

FAULT DETECTION DEVICE WITH LINE-LOAD MISWIRE PROTECTION

CROSS-REFERENCE TO RELATED APPLICATIONS

This application claims priority from U.S. Provisional Application Ser. No. 60/187,265 filed on Mar. 6, 2000 and entitled "GFCI OR AFCI WITH LINE-LOAD MIS-WIRE PROTECTION", incorporated herein by reference.

FIELD OF THE INVENTION

The invention pertains to the field of electrical fault detection devices connected to AC power lines, and in particular to a fault detection device with lineload miswire protection.

BACKGROUND OF THE INVENTION

Ground fault circuit interrupters (GFCIs) are well known in the art. Their intent is and always has been to protect the electrical power user from electrocution when hazardous ground fault currents are present. Arc fault circuit interrupters (AFCIs) are a more recent development. Their intent is to interrupt power when either a series arc fault or a parallel arc fault is present in the wiring.

Historical problems with these devices include the possibility of line/load miswiring in the field by an installer, which causes the interrupter device to become inoperable while electrical power is still present, even under hazardous ground fault or arc fault conditions. A variety of methods are used to prevent or attempt to prevent miswiring with varying levels of success. Labels and installation instruction sheets have been used to prevent miswiring, but can be ignored by the installer.

U.S. Pat. No. 5,363,269 discloses revealing reversal of the line and load wires of a receptacle-type GFCI by connecting the test button circuit between load hot and ground.

U.S. Pat. No. 5,541,800 discloses avoiding line/load miswiring by placing a Mylar insulator in one power contact and instructing the user to remove the insulator only after the GFCI trips in response to the t-button.

U.S. Pat. No. 5,600,524 discloses an intelligent GFCI with an audible alarm to alert the user to periodically test the GFCI, circuitry to test the electronics on a periodic basis, and circuitry that determines if the line and load are miswired and that prevents the GFCI from resetting if the miswired condition is identified.

U.S. Pat. No. 5,706,155 discloses an intelligent GFCI with an audible alarm that indicates miswiring.

U.S. Pat. No. 6,040,967 discloses a device that guards against miswiring. Although not fully disclosed in the patent, the device is tripped out when sold. If supply voltage is not connected to the line terminals, (i.e., if the device is line/load miswired), it cannot be reset because the solenoid needs line side power to move a mechanical stop out of the way which otherwise prevents resetting.

There exists a need for a low cost, effective device which prevents line-load miswiring.

SUMMARY OF THE INVENTION

Briefly stated, a protection device connected between hot and neutral conductors of an AC power line includes a fault detection circuit which controls a breaker coil operatively associated with a set of interrupting contacts. A capacitance circuit connected between the hot conductor and the neutral conductor stores a charge of a polarity indicative of a line-load miswire. This stored charge independently activates the set of interrupting contacts when the interrupting contacts are closed and the device is miswired, thus preventing the miswired device from providing power.

According to an embodiment of the invention, a protection device connected between hot and neutral conductors of an AC power line includes a fault detection circuit including a first switch controlling a breaker coil operatively associated with a set of interrupting contacts; a capacitance circuit connected between the hot conductor and the neutral conductor; a switching circuit connected to the capacitance circuit and to the first switch; wherein connecting AC power to load terminals of the protection device causes the capacitance circuit to store a first charge of a first polarity indicative of a line-load miswire; and wherein a presence of the first charge causes the switching circuit to activate the first switch and open the set of interrupting contacts when the set of interrupting contacts is closed.

According to an embodiment of the invention, a protection device connected between hot and neutral conductors of an AC power line includes means for detecting a connection of AC supply voltage to improper terminals of the device; means for tripping an interrupting mechanism upon the detection; and means for preventing the protection device from being reset while the AC supply voltage is connected to the improper terminals of the device.

According to an embodiment of the invention, a protection device connected between hot and neutral conductors of an AC power line includes detection means for detecting a fault in the AC power line, the detection means including first switching means for controlling a breaker coil operatively associated with a set of interrupting contacts; capacitance means connected between the hot conductor and the neutral conductor for storing a charge of a polarity indicative of a line-load miswire between the AC power line and the protection device; and second switching means, connected to the capacitance means and to the first switching means, for activating the first switching means when the charge is present in the capacitance means.

According to an embodiment of the invention, a method for preventing a lineload miswire of a protection device connected between hot and neutral conductors of an AC power line includes the steps of storing a charge of a polarity indicative of the line-load miswire between the AC power line and the protection device; and interrupting power within the protection device when the stored charge is present.

DETAILED DESCRIPTION OF THE PREFERRED EMBODIMENT

Figure 1:
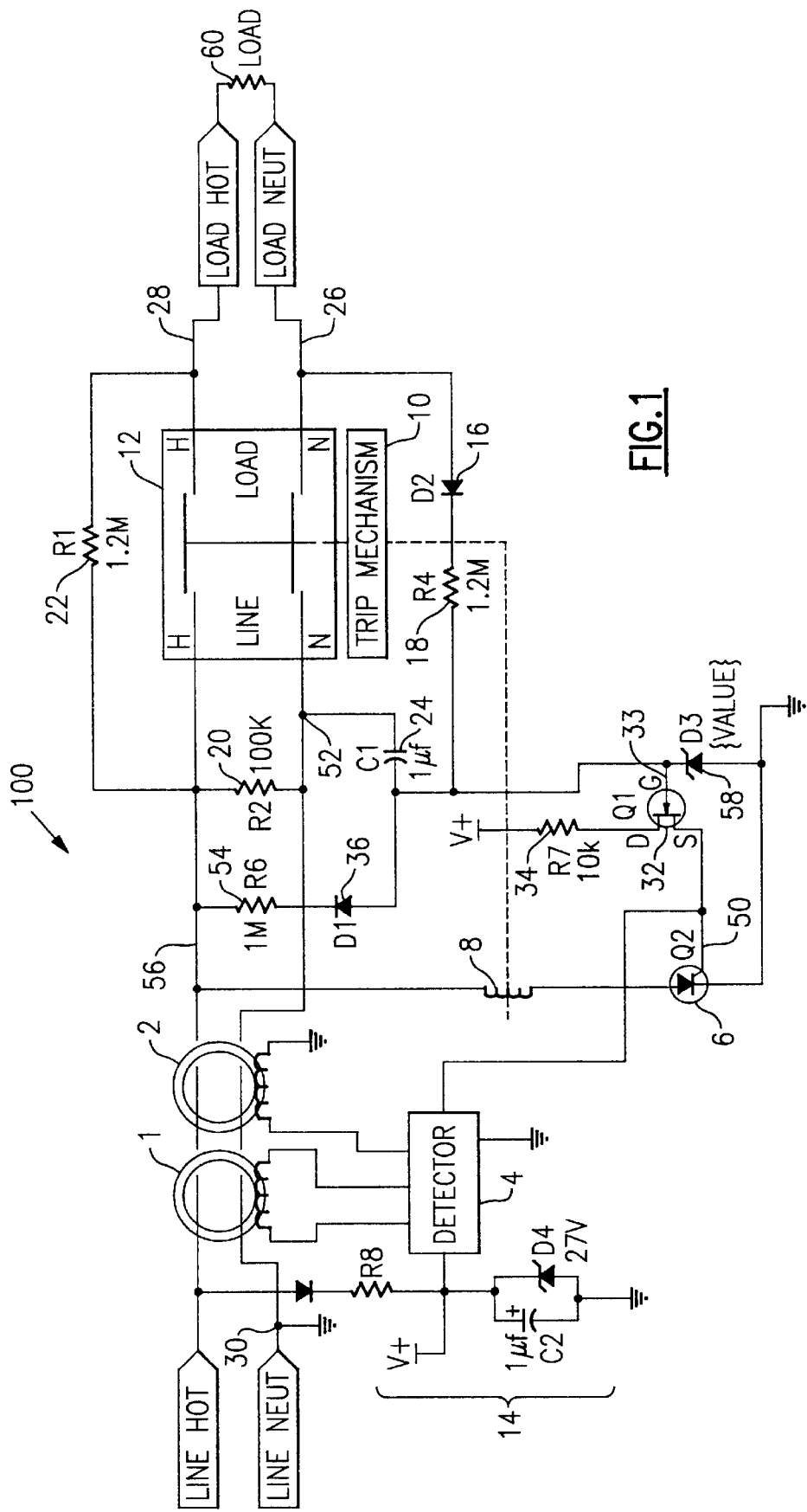
FIG. 1 shows an embodiment of the invention as applied to a GFCI protection device.

Referring to FIG. 1, a fault detector such as a GFCI 100 is shown. A differential ground fault sensor transformer 1 senses any difference in the currents flowing in a line hot wire 56 and a line neutral wire 52. A grounded neutral transformer transmitter 2 reacts to downstream grounding of line neutral wire 52 and communicates with sensor transformer 1. When contactor 12 is closed, the dangerous conditions associated with current flow in a load hot wire 28 and a load neutral wire 26 are sensed. A detector 4, which receives input from transformer 11 and outputs to transmitter 2, sends a signal to a switch such as an SCR 6 when a ground fault is sensed. SCR 6 is activated when the signal from detector 4 reaches a gate 50 of SCR 6, which in turn activates a solenoid 8. The activation of solenoid 8 in turn activates a trip mechanism 10 which activates contactor 12, interrupting current through load hot sire 28 and load neutral wire 26, which may also be connected to a load 60.

When contactor 12 is open and GFCI 100 is miswired with the AC power source connected to the load terminals instead of the line terminals, current flows from load neutral wire 26 in a series string through a diode 16, a limit resistor 18, a capacitor 24, a resistor 20, and a resistor 22 to return to load hot wire 28. This current flow charges capacitor 24 to a positive voltage above a GFCI reference voltage 30. The voltage across capacitor 24 also appears across a gate 33 of an electronic switch such as a FET 32, which would cause FET 32 to turn ON in the presence of voltage V+ from a GFCI DC power supply 14. However, because contactor 12 is open and the AC power is miswired to the load terminals, no voltage V+ is present from power supply 14.

When contactor 12 is closed while GFCI 100 is miswired, AC power appears across the series combination of SCR 6 and solenoid 8, and also activates power supply 14. The voltage held across charged capacitor 24 now causes FET 32 to turn ON, which conducts current from voltage supply V+ of power supply 14 through a limit resistor 34 to gate 50, causing SCR 6 to activate solenoid 8 and trip out GFCI 100 through trip mechanism 10 and contactor 12. Thus, once contactor 12 is open, either by testing GFCI 100 on installation or by installing GFCI 100 in the tripped state, with the line-load terminals miswired, GFCI 100 cannot be reset without an instant trip.

When the AC power is correctly connected to the line terminals of GFCI 100, and when contactor 12 is either open or closed, a charge current flows from line neutral wire 52 through the series string consisting of capacitor 24, a diode 36, and a resistor 54 to return to line hot wire 56. This current charges capacitor 24 in the opposite direction from when GFCI 100 is miswired, causing a negative voltage to appear across capacitor 24 with respect to reference voltage 30. This negative voltage prevents FET 32 from conducting, and thus prevents SCR 6 from activating via FET 32. A Zener diode 58 is a voltage clamp which preferably protects FET 32 from excessive voltage. A transistor could be used instead of FET 32.

Figure 2:
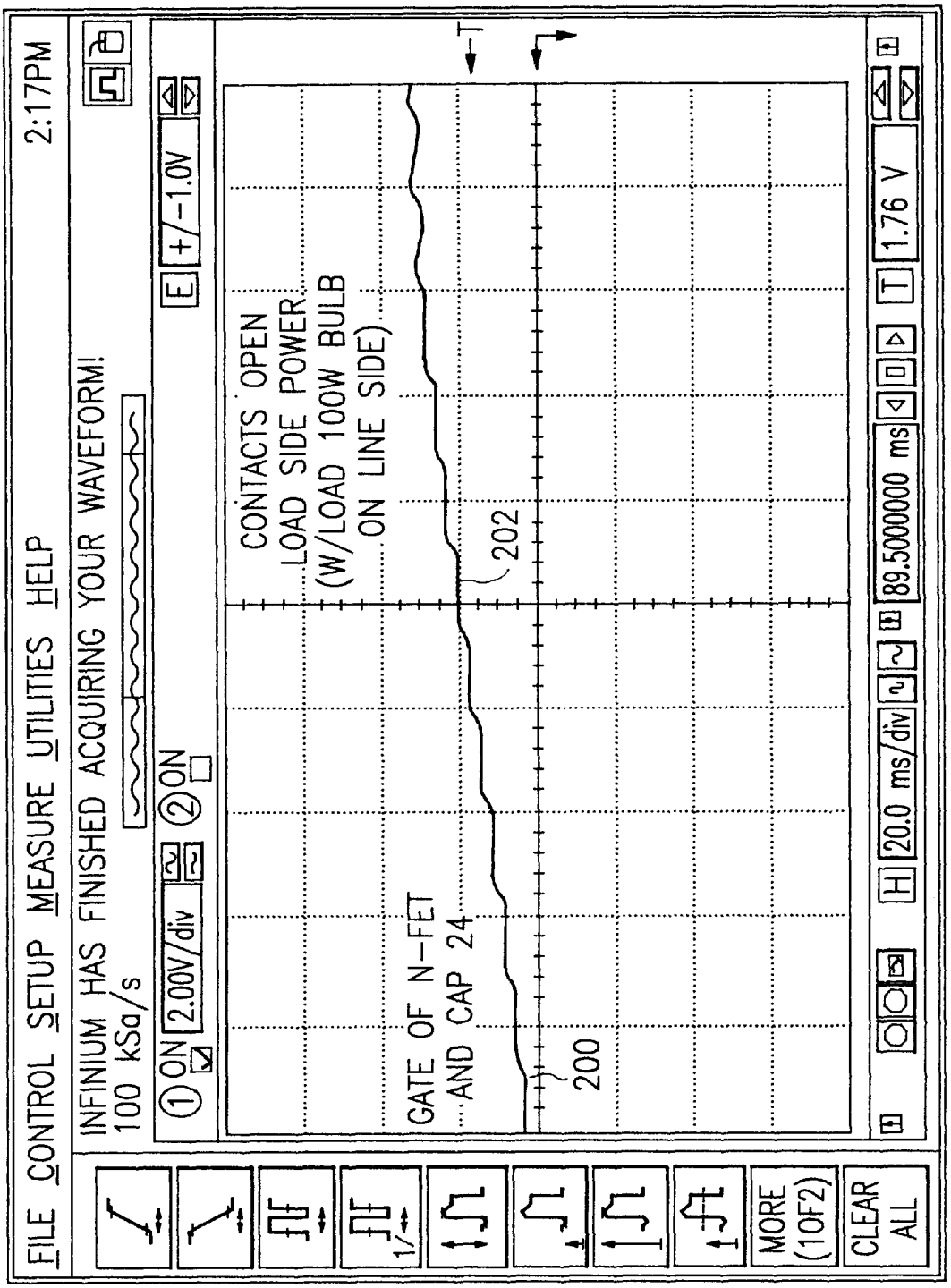
FIG. 2 shows a waveform used in explaining the functioning of the invention.
Figure 3:
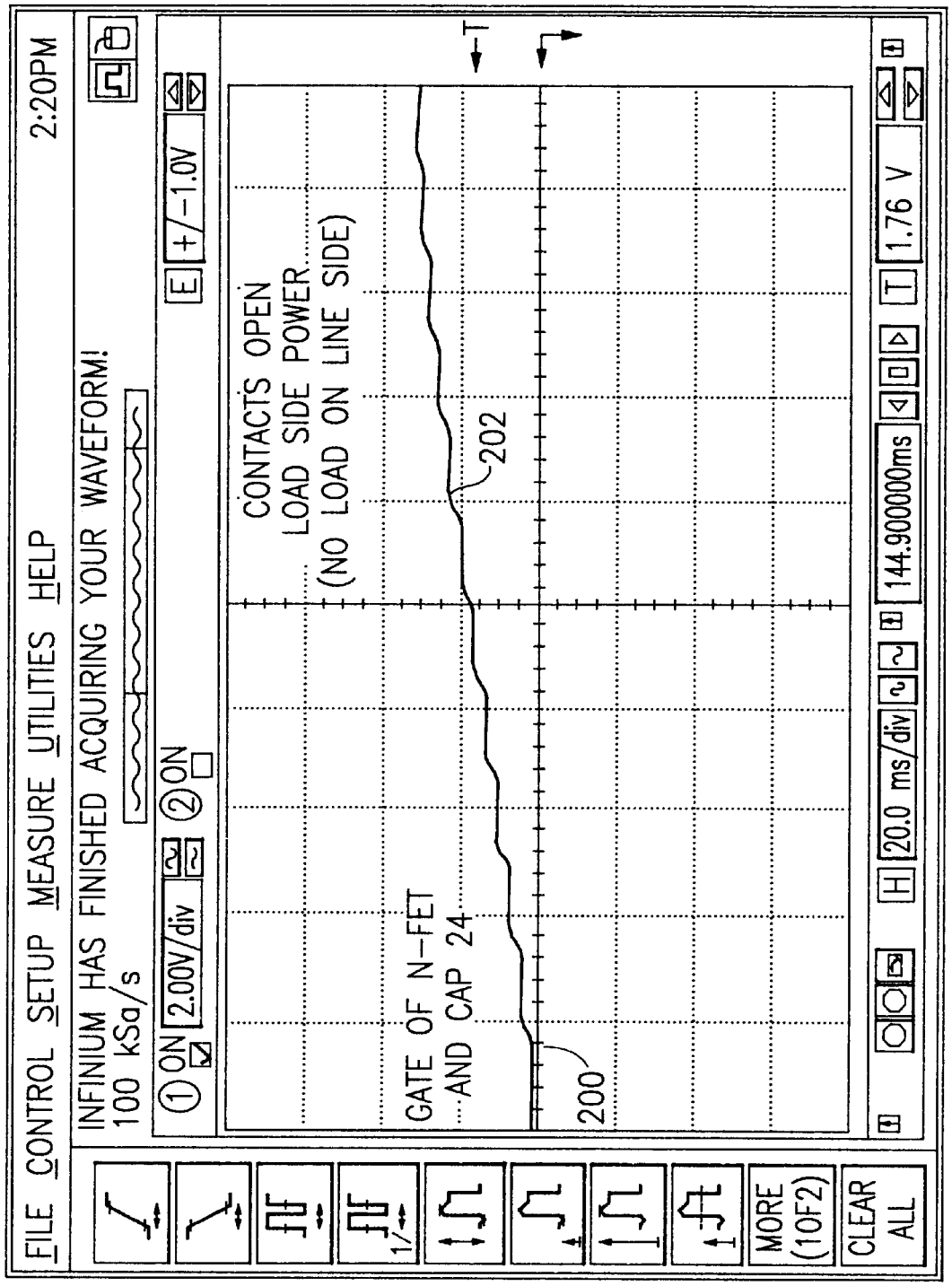
FIG. 3 shows a waveform used in explaining the functioning of the invention.

Referring also to FIGS. 2 and 3, a voltage waveform 202 is shown across gate 33 of FET 32, shown with (FIG. 2) and without (FIG. 3) a miswired load connected to the line side of GFCI 100, along with the AC power supply miswired to the load side of GFCI 100. Contactor 12 is open. Power is applied at time 200, and waveform 202 is a positive charging waveform across capacitor 24. In either case, i.e., load or no load, a positive charge occurs in capacitor 24. The positive charge activates FET 32 and SCR 6 when contactor 12 is closed, thus tripping out GFCI 100.

Figure 4:
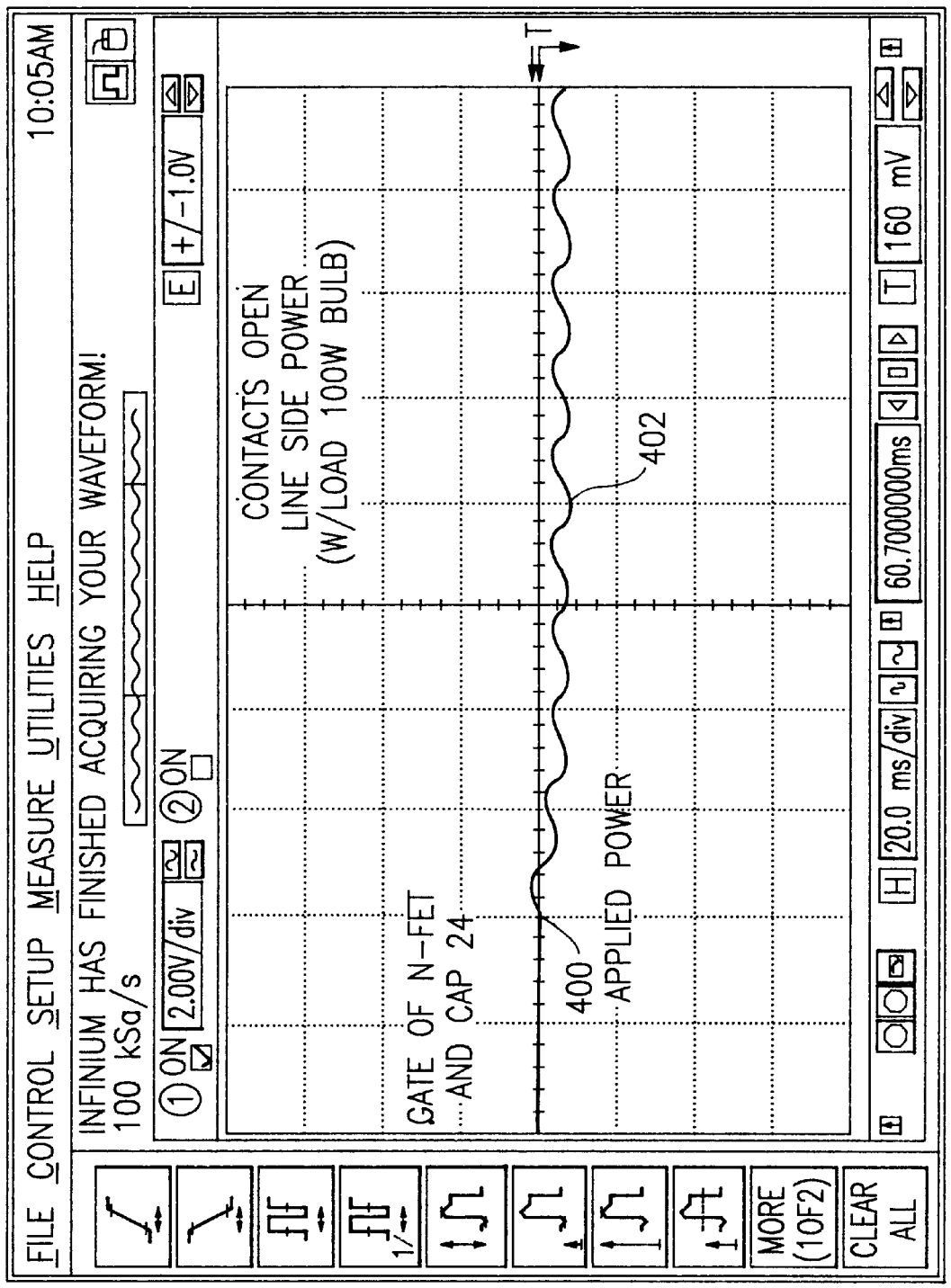
FIG. 4 shows a waveform used in explaining the functioning of the invention.
Figure 5:
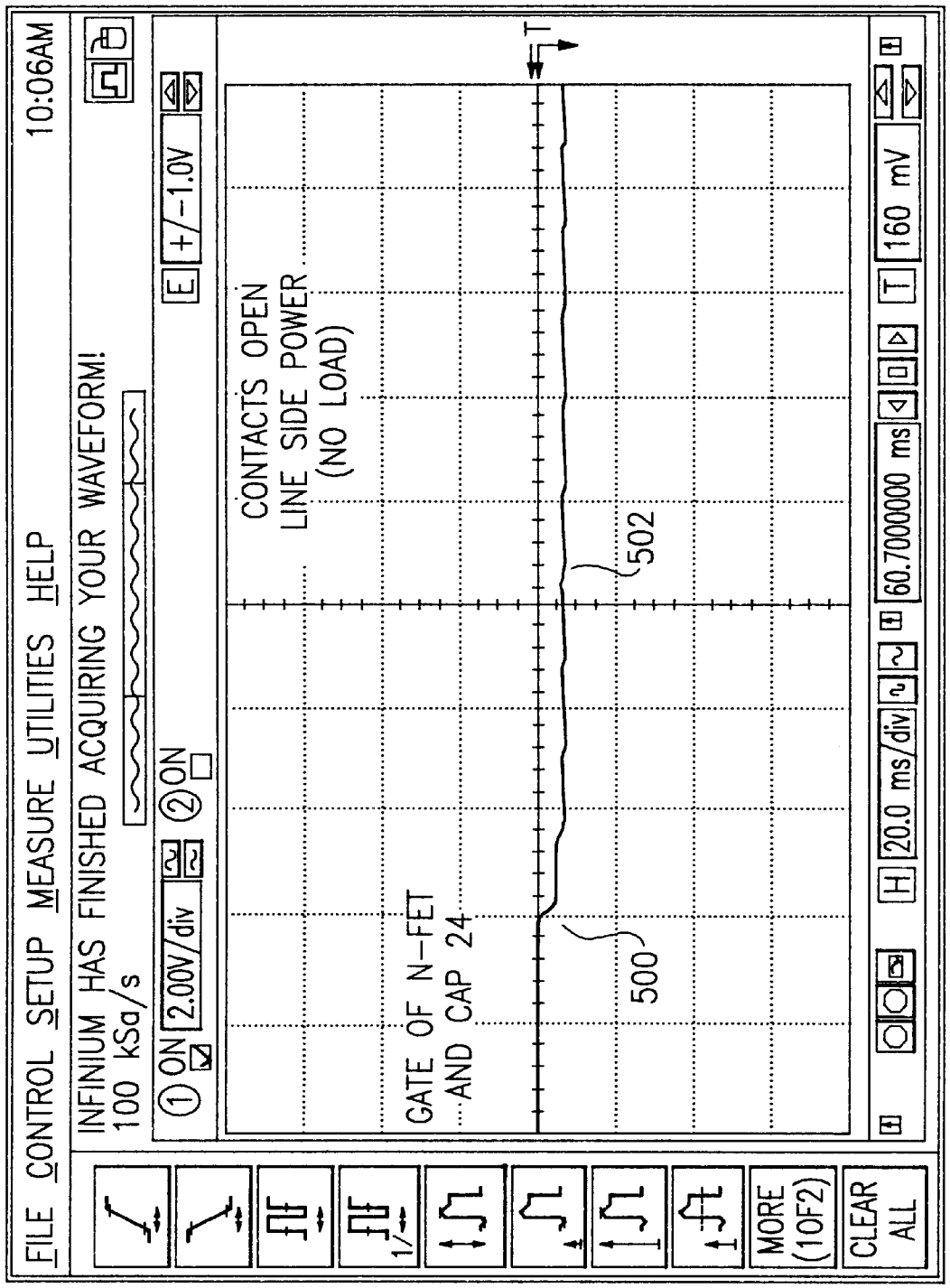
FIG. 5 shows a waveform used in explaining the functioning of the invention.

Referring also to FIGS. 4 and 5, the state of correct GFCI wiring, voltage waveforms 402 and 502 are shown across gate 33, shown with (FIG. 4) and without (FIG. 5) a load connected to the load side of GFCI 100. The line side of GFCI 100 is correctly connected to the AC power supply, and contactor 12 is in the closed state. Waveform 502 also shows the voltage waveform when contactor 12 is open. Power is applied to waveform 402 at a time 400 (FIG. 4) and to waveform 502 at a time 500 (FIG. 5). Both FIGS. 4 and 5 show the negative charging voltage waveforms 402 and 502, respectively, across capacitor 24. This stored negative charge holds FET 32 OFF regardless of the state of contactor 12 so that SCR 6 is not activated by FET 32. Of course, SCR 6 can still be activated by detector 4 if a ground fault is detected. The negative charging waveforms 402 and 502 also occur when GFCI 100 is miswired with contactor 12 closed, and therefore a positive trip causing charge accumulation in capacitor 24 can only occur when GFCI 100 is miswired and contactor 12 is open.

Waveform 402 is different from waveform 502 because of a second charge path from line hot wire 56 through resistor 22, through load 60, diode 16, resistor 18, and capacitor 24 before returning to line neutral wire 52. Although this path causes positive charging of capacitor 24, it is overwhelmed by the negative charge path through diode 36 and resistor 54, which path is designed with less resistance.

Figure 6:
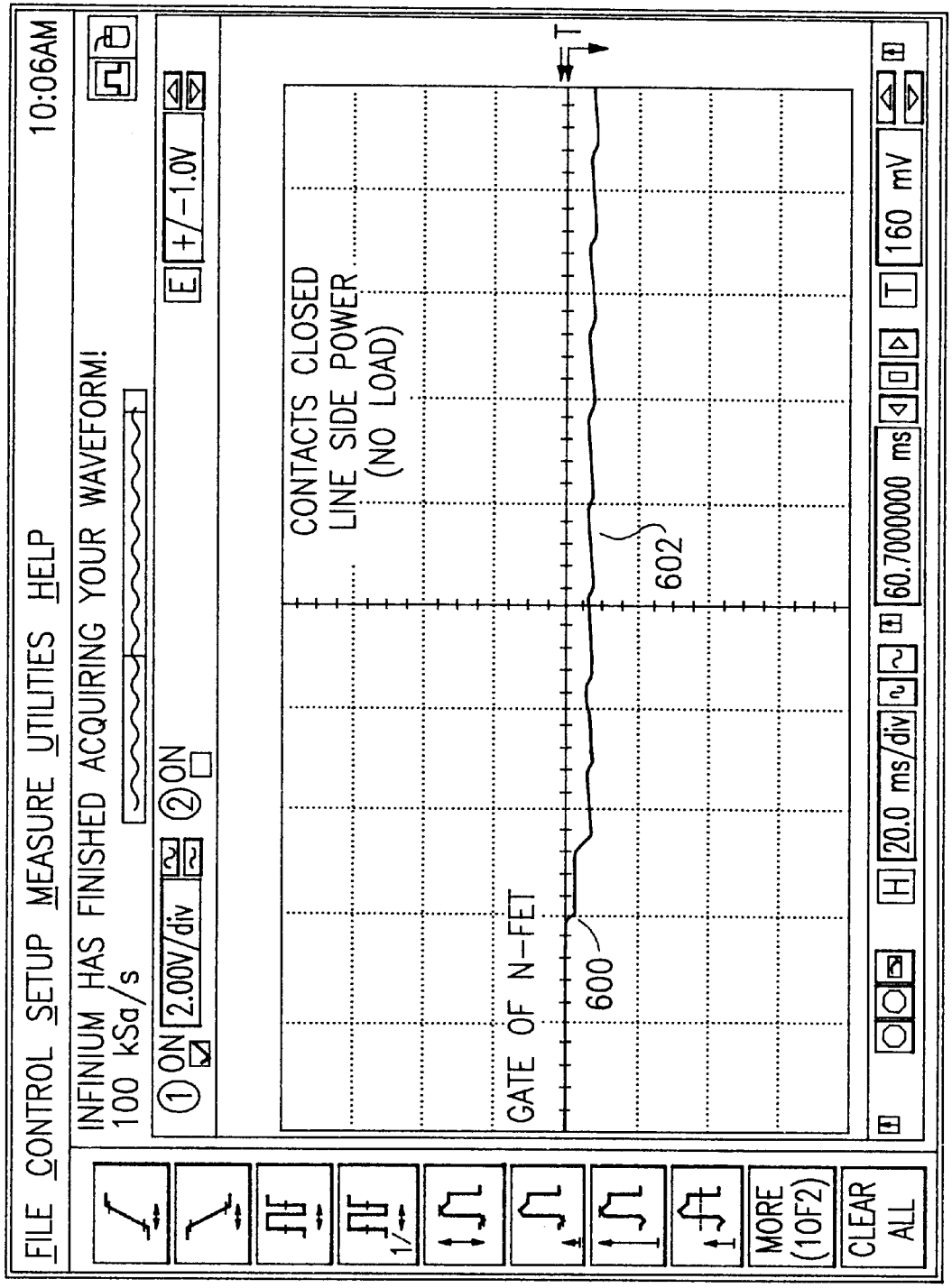
FIG. 6 shows a waveform used in explaining the functioning of the invention.

Referring also to FIG. 6, a voltage waveform 602 is shown across capacitor 24 when contactor 12 is closed. Waveform 602 appears when GFCI 100 is powered from either the line side or the load side when contactor 12 is closed, with the negative voltage keeping FET 32 out of conduction.

The present invention allows resistors 22 and 18 to be of high value, above the Meg-ohm range, which prevents any shock hazard via these paths when GFCI 100 is in the tripped and contactor open state.

Although the waveforms show an imbalance between the negative and positive voltages appearing across capacitor 24 during correct wiring and miswiring respectively, the magnitude of the negative charge across capacitor 24 can be increased by decreasing the resistance of resistor 54.

Although the present invention is described using a GFCI, an embodiment using an AFCI will work equally well and application of the invention to an AFCI embodiment is considered to be within the knowledge of one skilled in the art.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A protection device connected between hot and neutral conductors of an AC power line, comprising:
    a fault detection circuit including a first switch controlling a breaker coil operatively associated with a set of interrupting contacts;
    a capacitance circuit connected between said hot conductor and said neutral conductor;
    a switching circuit connected to said capacitance circuit and to said first switch;
    wherein connecting AC power to load terminals of said protection device causes said capacitance circuit to store a first charge of a first polarity indicative of a line-load miswire; and
    wherein a presence of said first charge causes said switching circuit to activate said first switch and open said set of interrupting contacts when said set of interrupting contacts is closed.

2. A device according to claim 1, wherein connecting AC power to line terminals of said protection device causes said capacitance circuit to store a second charge of a second polarity indicative of no line-load miswire; and wherein a presence of said second charge does not cause said switching circuit to activate said first switch when said set of interrupting contacts is closed.

3. A device according to claim 1, wherein said switching circuit includes a field effect transistor whose gate is connected to said capacitance circuit, whose source is connected to said first switch, and whose drain is connected to a line-side power supply.

4. A device according to claim 3, further including a voltage clamp connected between said gate of said field effect transistor and a reference potential.

5. A device according to claim 1, wherein said switching circuit includes a bipolar junction transistor.

6. A device according to claim 1, wherein said fault detection circuit detects a ground fault.

7. A device according to claim 1, wherein said fault detection circuit detects a grounded neutral.

8. A device according to claim 1, wherein said fault detection circuit detects an arc fault.

9. A protection device connected between hot and neutral conductors of an AC power line, comprising:

means for detecting a connection of AC supply voltage to improper terminals of said device;

means for tripping an interrupting mechanism upon said detection; and means for preventing said protection device from being reset while said AC supply voltage is connected to said improper terminals of said device.

10. A protection device connected between hot and neutral conductors of an AC power line, comprising:

detection means for detecting a fault in said AC power line, said detection means including first switching means for controlling a breaker coil operatively associated with a set of interrupting contacts;

capacitance means connected between said hot conductor and said neutral conductor for storing a charge of a polarity indicative of a line-load miswire between said AC power line and said protection device; and second switching means, connected to said capacitance means and to said first switching means, for activating said first switching means when said charge is present in said capacitance means.

11. A device according to claim 10, wherein said detection means detects a ground fault.

12. A device according to claim 10, wherein said detection means detects a grounded neutral.

13. A device according to claim 10, wherein said detection means detects an arc fault.

14. A method for preventing a line-load miswire of a protection device connected between hot and neutral conductors of an AC power line, comprising the steps of:

storing a charge of a polarity indicative of said line-load miswire between said AC power line and said protection device; and interrupting power within said protection device when said stored charge is present.

* * * * *